Patented Dec. 10, 1946

2,412,209

UNITED STATES PATENT OFFICE 2,412,209

PREPARATION OF ALIPHATIC AMINES

Joseph B. Dickey and James G. McNally, Rochester, N. Y., assignors to Eastman Kodak Company, Rochester, N. Y., a corporation of New Jersey No Drawing. Application April 22, 1943,
Serial No. 484,078

4 Claims. (Cl. 260—584)

This invention relates to aliphatic hydroxy amines and to the preparation thereof.

It is known that aliphatic monoamines can be prepared by condensing monohydric alcohols with ammonia, in the presence of a metallic hydrogenation catalyst. When dihydric alcohols, such as tetramethylene glycol and pentamethylene glycol, are condensed with ammonia in the presence of a hydrogenation catalyst, however, a considerable amount of cyclization occurs with the formation of compounds such as pyrrol and pyridine, so that tetramethylene diamine and pentamethylene diamine cannot be commercially prepared by this method. For this season apparently tetra- and pentamethylene diamines, as well as higher molecular weight diamines, are prepared by reducing the appropriate dinitriles.

We have now found that dihydric ether alcohols, such as diethylene glycol and triethylene glycol, can be condensed with ammonia, in the presence of hydrogenation catalysts to give good yields of hydroxy amines. Some cyclization occurs and some formation of diamines occur, but the hydroxy amines can be readily separated from the cyclic compounds and the diamines. We have also found that aliphatic diamines can be prepared in good yields from hexa- to decamethylene glycols by condensing the glycols with ammonia, in the presence of a hydrogenation catalyst.

It is accordingly, an object of our invention to provide new hydroxy amines. A further object is to provide a process for preparing such hydroxy amines and a process for preparing diamines. Other objects will become apparent hereinafter.

In accordance with our invention, we condense ammonia with a dihydric alcohol characterized by one of the following general formulas:

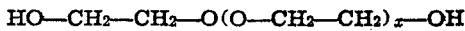

wherein $n$ represents a positive integer of from 6 to 10 and $x$ represents a positive integer of from 1 to 2, at a temperature of from about 160° C. to about 400° C., in the presence of a hydrogenation catalyst. When diethylene glycol is employed as a starting material, the temperature employed is advantageously from 200° to 250° C. Exemplary of hydrogenation catalysts which we have employed are Raney nickel, copper chromite, copper nickel chromite, iron, cobalt, titanium, copper, etc. The condensations can be carried out in the liquid or gaseous phase. If the condensations are carried out in the gaseous phase, the dihydric alcohol is led over the catalyst, e. g. nickel on kieselguhr, in a glass or metal tube heated to the desired temperature.

The following examples will serve to illustrate the manner of practicing our invention.

*Example 1.—2-[2-(2-hydroxyethoxy)-ethoxy] ethylamine*

400 g. of triethylene glycol

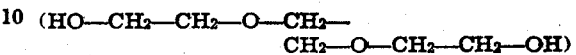

were charged into an autoclave with 20 g. of Raney nickel catalyst. The glycol was then saturated with ammonia from a cylinder of ammonia. The autoclave was closed and the mixture heated with shaking at 205° C. for 31 hours. The autoclave was then cooled and the contents made acid with hydrochloric acid. The non-basic materials were then removed from the mixture by distillation under reduced pressure. The residue was treated with an excess of 50 percent aqueous sodium hydroxide to free the amino bodies from their hydrochlorides. The amines which separated were removed from the aqueous liquors and distilled under reduced pressure. 20 g. of

boiling at 95° to 105° C. at 5 mm. of mercury pressure and 40 g. of

boiling at 120° to 130° C. at 4 mm. of mercury pressure, were obtained. The residue from the distillation contained higher boiling secondary and tertiary amines.

*Example 2.—2-(2-hydroxyethoxy)-ethylamine*

424 g. of diethylene glycol

and 25 g. of nickel on kieselguhr were placed in an autoclave. The mixture was saturated with ammonia from a cylinder of ammonia. The autoclave was then closed and the mixture was heated at 205° C. with shaking for 37 hours. At the end of this time, the autoclave was cooled and the contents made acid with hydrochloric acid. The monobasic materials were then removed from the mixture by distillation under reduced pressure. To the residue was added an excess of 50 percent aqueous sodium hydroxide to free the amino bodies from their hydrochlorides. The amines which separated were removed from the aqueous liquors and fractionally distilled, first at ordinary pressures and then under reduced pressures. Morpholine boiling at 182° to 184° C. at 745 mm. of mercury pressure, and a good yield of 2-(2-hydroxyethoxy)-ethylamine boiling at 123° C. at 7 mm. of mercury pressure, were obtained. In addition there was obtained a small amount of some amines boiling between 135° C. and 180° C. at 7 mm. of mercury pressure.

*Example 3.—1,10-diamino decane*

82 g. of decamethylene glycol were placed in an autoclave with 10 g. of Raney nickel. To the mixture were added 180 g. of ammonia by passing ammonia into the mixture from a cylinder of ammonia. The autoclave was then closed and the mixture heated with shaking at 220° to 260° C. for 40 hours. The autoclave was then cooled and the contents steam distilled to obtain the decamethylene diamine. A 25 percent yield of diamine melting at 61° to 62° C. was obtained.

In a similar manner octamethylene glycol can be condensed with ammonia to give 1,8-diamino octane and hexamethylene glycol can be condensed with ammonia to give 1,6-diamino hexane.

What we claim as our invention and desire to be secured by Letters Patent of the United States is:

1. A process for preparing an aliphatic hydroxyamine comprising condensing ammonia with a dihydric alcohol of the following formula:

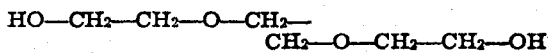

at a temperature of from about 200° to about 250° C., in the presence of a hydrogenation catalyst.

2. A process for preparing an aliphatic hydroxyamine comprising condensing ammonia with a dihydric alcohol of the following formula:

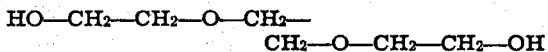

at a temperature of from about 200° to about 250° C., in the presence of a metallic hydrogenation catalyst.

3. A process for preparing a hydroxyamine comprising condensing ammonia with a dihydric alcohol of the following formula:

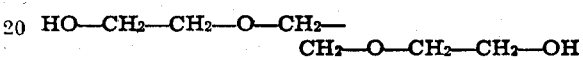

at a temperature of from about 200° to about 250° C., in the presence of a nickel hydrogenation catalyst.

4. 2-[2-(2-hydroxyethoxy)-ethoxy]-ethylamine.

JOSEPH B. DICKEY.
JAMES G. McNALLY.